United States Patent
Shahramian et al.

(10) Patent No.: US 10,268,614 B2
(45) Date of Patent: Apr. 23, 2019

(54) METHOD AND APPARATUS FOR A SEGMENTED ON-CHIP DIGITAL INTERFACE BLOCK

(71) Applicant: NOKIA OF AMERICA CORPORATION, Murray Hill, NJ (US)

(72) Inventors: Shahriar Shahramian, Chatham, NJ (US); Yves Baeyens, Stirling, NJ (US); Ut-Va Koc, Bridgewater, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 353 days.

(21) Appl. No.: 15/132,412

(22) Filed: Apr. 19, 2016

(65) Prior Publication Data
US 2017/0300438 A1 Oct. 19, 2017

(51) Int. Cl.
*G06F 13/14* (2006.01)
*G06F 13/364* (2006.01)
*G06F 13/42* (2006.01)
*G06F 13/40* (2006.01)

(52) U.S. Cl.
CPC .......... *G06F 13/364* (2013.01); *G06F 13/404* (2013.01); *G06F 13/4282* (2013.01)

(58) Field of Classification Search
CPC ............. G06F 13/4221; G06F 13/4027; G06F 13/364; G06F 13/404; G06F 13/4282
See application file for complete search history.

(56) References Cited

U.S. PATENT DOCUMENTS

| 5,948,089 | A | 9/1999 | Wingard et al. |
| 7,165,094 | B2 | 1/2007 | Weber et al. |
| 8,195,857 | B2 | 6/2012 | Barrenscheen |
| 9,946,680 | B2 * | 4/2018 | Chavez ............. G05B 19/0421 |
| 2014/0122756 | A1 | 5/2014 | Laskar |

FOREIGN PATENT DOCUMENTS

WO 2002025449 A2 3/2002

* cited by examiner

*Primary Examiner* — Idriss N Alrobaye
*Assistant Examiner* — Richard B Franklin
(74) *Attorney, Agent, or Firm* — Chiesa Shahinian & Giantomasi PC (57) ABSTRACT

A method and architecture for operating with distributed (or segmented) on-chip digital interfaces such as the Inter-Integrated Circuit protocol and a Serial Peripheral Interface protocol. This method and architecture, illustratively, divides the available address space of the digital interface register arrays of a device into one or more segments referred to as a fundamental digital interface circuit. Such segmentation allows for each fundamental digital interface circuit to be placed in proximity of the digitally controlled circuit(s) (e.g., analog circuit(s)) which share some operational connection and for exchanging communication in accordance with a plurality of inputs to the device.

29 Claims, 5 Drawing Sheets

METHOD AND APPARATUS FOR A SEGMENTED ON-CHIP DIGITAL INTERFACE BLOCK

TECHNICAL FIELD

The present invention relates generally to integrated circuits that utilize bus communications, and more particularly, to integrated circuits that utilize on-chip digital interface blocks operating in accordance with particular bus/protocol standards.

BACKGROUND

Today, in the digital era, modern electronic devices utilize a variety of integrated circuits (ICs) to deliver the powerful and myriad of functions and applications available from such devices. It is not uncommon for such devices to have numerous ICs configured therein to cooperate and communicate in an orderly way to exchange information (e.g., receive and/or transmit different types of data and/or information) among themselves and between other external devices and/or the user of the device.

Central to such communications between and among these ICs is the ability of one IC to send data or other information to another IC (or ICs) in response to, for example, a query signal from another IC. These point-to-point interfaces typically occur across a bus structure that serves as a common communication channel for a plurality of ICs configured within the device. This bus structure can be facilitated by either custom communications interfaces or standardized interfaces that provide a standardized communication link.

One such standardized bus system is the so-called Inter-Integrated Circuit bus or the I²C bus. The I²C is a multi-master, multi-slave, single-ended, serial computer bus protocol and system. The I²C bus operates on a protocol that allows a plurality of ICs to be connected to and in communication with one another over a common bus structure. More particularly, I²C is a serial bus protocol that allows various ICs or other components within a device to communicate with one another where each IC or component is assigned a unique address. As such, the I²C system grows as more types of ICs are uniquely registered. The I²C system then employs such unique addresses to send and/or receive data to and/or from a particular IC.

Another well-known bus communications standard is the so-called Serial Peripheral Interface (SPI) bus. The SPI bus is a synchronous serial communication interface specification used for short distance communication, primarily in embedded systems, by microcontrollers for communicating with one or more peripheral devices. In accordance with SPI, there is always one master device (typically a microcontroller) which controls the peripheral devices and there are typically three common lines and one line specific for each device. SPI is sometimes referred to as a so-called four-wire serial bus, contrasting it with three, two or one-wire serial bus architectures. SPI-compliant ICs or other devices communicate in a full duplex mode using a master-slave architecture with a single master. The master device originates the frame for reading and writing whereby multiple slave ICs or other devices are supported through a selection with individual so-called slave select lines.

In distributed on-chip digital interfaces, such as I²C or SPI, the distribution of numerous digital control lines poses certain challenges such as routing, silicon footprint (i.e., potentially wasting expensive silicon area of an IC), and signal interference among devices (e.g., analog signal interference in analog signaling applications). As such, the design of densely packed, digitally-assisted application specific integrated circuits (ASICs) are known to exacerbate the aforementioned challenges.

Therefore, a need exists for an improved technique that addresses these types of IC design challenges with respect to such distributed on-chip digital interfaces.

BRIEF SUMMARY OF EMBODIMENTS

In accordance with various embodiments, an enhanced method and architecture is provided for operating with distributed on-chip digital interfaces such as I²C or SPI. This method and architecture, illustratively, divides the available address space of the digital interface register arrays into one or more segments (each such segment also referred to herein as a so-called "fundamental digital interface circuit"). Such segmentation allows for, in accordance with an embodiment, each fundamental digital interface circuit to be placed in proximity of the digitally controlled circuit(s) (e.g., analog circuit(s)) which share some operational connection and a common communication bus. For example, mixed-signal circuits (e.g., data converters, radio frequency integrated circuit (RFIC) radios, and phase-locked loops, to name just a few) which require digital calibration circuitry may use a large number of digital lines (e.g., 100 or more) which can be placed in close proximity of the desired blocks without global IC routing.

In accordance with an embodiment, an integrated circuit is configured with a plurality of fundamental digital interface circuits wherein each such fundamental digital interface circuit has a set of inputs (e.g., a set of N inputs) and a set of outputs (e.g., a set of M outputs) where N and M are integers and M is greater than or equal to N, and a plurality of signal paths are routed from a particular externally accessible location on the integrated circuit to the corresponding input (or inputs) of a particular one (or ones) fundamental digital interface circuits of the plurality of fundamental digital interface circuits.

As such, the address space of the digital interface register arrays of the integrated circuits are divided into segments (i.e., the plurality of fundamental digital interface circuits). In accordance with the embodiment, each fundamental digital interface circuit has at least one input port associated with a unique address where such unique address corresponds to and defines a unique memory address associated with a particular one fundamental digital interface circuit. Each fundamental digital interface circuit, in accordance with an embodiment, is further configured with a local memory for storing certain data that is useful to facilitate adjusting one or more parameters of the fundamental digital interface circuit.

These configurations, in accordance with the various embodiments herein, facilitate a physical layout wherein each digital segment (i.e., each fundamental digital interface circuit) can be located proximally to the one or more digitally controlled circuits also resident on the integrated circuit (e.g., a plurality of analog circuits) while maintaining the external interface of the integrated circuit and internally daisy-chaining each fundamental digital interface circuit.

These and other advantages will be apparent to those of ordinary skill in the art by reference to the following detailed description and the accompanying drawings.

DETAILED DESCRIPTION

In accordance with various embodiments, an enhanced method and architecture is provided for operating with distributed on-chip digital interfaces such as I²C or SPI. This method and architecture, illustratively, divides the available address space of the digital interface register arrays into one or more segments (i.e., each fundamental digital interface circuit representing a segment). Such segmentation allows for, in accordance with an embodiment, each fundamental digital interface circuit to be placed in proximity of the digitally controlled circuit(s) (e.g., analog circuit(s)) which share some operational connection across a common communications bus.

Figure 1:
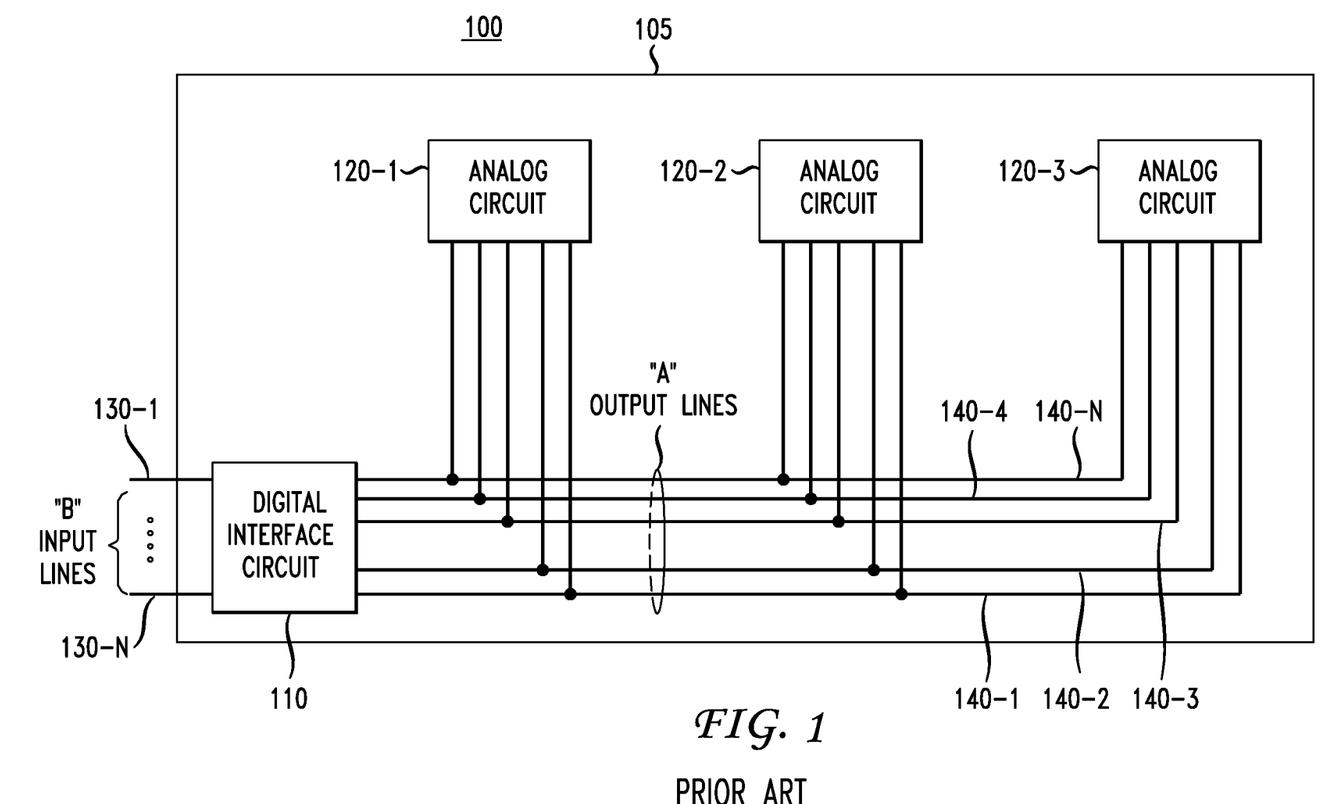
FIG. 1 shows a prior art distributed architecture for an integrated circuit configuration having a digital interface circuit.

FIG. 1 shows a prior art distributed architecture for an integrated circuit configuration having a digital interface circuit. As will be appreciated, distributed architecture 100 may by utilized with either of the I²C or SPI protocols. The distributed architecture 100 is illustratively shown for integrated circuit 105 having digital interface circuit 110 having multiple inputs, namely, input 130-1 through 130-N (forming "B" inputs, as shown) and multiple outputs, namely, output 140-1, 140-2, 140-3, 140-4 through 140-N (forming "A" outputs, as shown). Such outputs being internally connected to several analog circuits, namely, analog circuit 120-1, analog circuit 120-2, and analog circuit 120-3, respectively. As will be appreciated, distributed architecture 100 may suffer from routing issues and/or signal interference with analog circuits 120-1, 120-2, or 120-3. For example, global integrated circuit routing consumes valuable IC footprint in terms of layout which can be used for other purposes, and long digital interconnects on mixed signal integrated circuits are known to inject unwanted noise into sensitive analog and RF circuits. Also, high-speed RFIC circuits typically have stringent spacing and routing requirements which may prevent additional long digital routing throughout the IC footprint. As such, short distance connection of digital is typically preferred.

Figure 2:
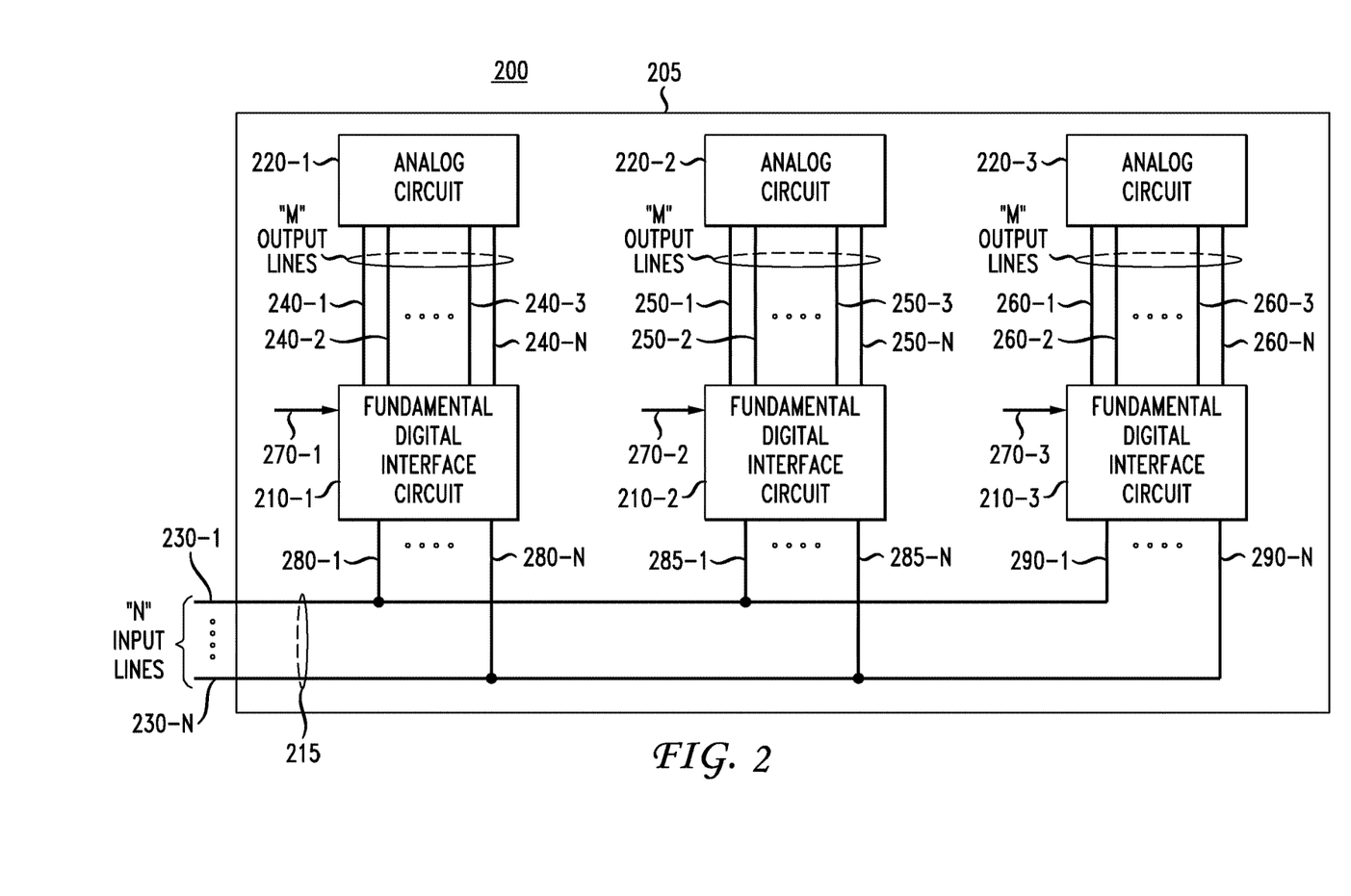
FIG. 2 shows an illustrative distributed architecture for an integrated circuit configuration having a segmented digital interface block in accordance with an embodiment.

FIG. 2 shows an illustrative distributed architecture for an integrated circuit configuration having a segmented digital interface block in accordance with an embodiment. In particular, distributed architecture 200 can be utilized with either of the I²C or SPI protocols (or other protocols and systems operating in substantially the same way). The distributed architecture 200 is illustratively shown for integrated circuit 205 having a plurality of fundamental digital interface circuits, namely, fundamental digital interface circuit 210-1, fundamental digital interface circuit 210-2, and fundamental digital interface circuit 210-3, having multiple inputs, namely, input 230-1 through 230-N. As shown in FIG. 2, input 230-1 through 230-N forming a set of "N" input lines, where N is an integer value, communicated over and forming bus 215. As will be appreciated, such input lines can be command/address lines, assert lines, clock lines, data response lines, and flag lines, to name just a few. Each respective fundamental digital interface circuit has a set of respective outputs. Illustratively, fundamental digital interface circuit 210-1 has a plurality of outputs, namely, output 240-1, 240-2, 230-3 through 240-N, fundamental digital interface circuit 210-2 has a plurality of outputs, namely, output 250-1, 250-2, 250-3 through 250-N multiple outputs, and fundamental digital interface circuit 210-3 has a plurality of outputs, namely, output 260-1, 260-2, 260-3 through 260-N.

As shown in FIG. 2, each of these plurality of outputs from the respective fundamental digital interface circuit (i.e., fundamental digital interface circuit 210-1, fundamental digital interface circuit 210-2, and fundamental digital interface circuit 210-3) form a set of "M" output lines where M is an integer value. Thus, integrated circuit 205 is configured with a plurality of fundamental digital interface circuits wherein each such fundamental digital interface circuit has a set of inputs (e.g., a set of N inputs such as input 230-1 through input 230-N) and a set of outputs (e.g., a set of M outputs such as output 240-1 through 240-N) where N and M are integers and M is greater than or equal to N, and a plurality of signal paths (i.e., input 230-1 through input 230-N) are routed from a particular externally accessible location on the integrated circuit to the corresponding input (or inputs) of a particular one (or ones) fundamental digital interface circuit of the plurality of fundamental digital interface circuits. For example, inputs 280-1 through 280-N of fundamental digital interface circuit 210-1, inputs 285-1 through 285-N of fundamental digital interface circuit 210-2, and inputs 290-1 through 290-N of fundamental digital interface circuit 210-3. In accordance with the embodiment, it will be noted, that the selection of the integers M and N, respectively, must be such that the M number of outputs is greater than or equal to the N number of inputs.

Importantly, in accordance with the embodiment, distributed architecture 200 is, illustratively, divided such that the available address space is divided into the individual segments represented by fundamental digital interface circuit 210-1, fundamental digital interface circuit 210-2, and fundamental digital interface circuit 210-3. Further, each of the fundamental digital interface circuits has an individual input port associated therewith, namely input port 270-1 associated with fundamental digital interface circuit 210-1, input port 270-2 associated with fundamental digital interface circuit 210-2, and input port 270-3 associated with fundamental digital interface circuit 210-3 whereby a unique value is applied to define a unique memory address space associated with the respective fundamental digital interface circuit. As such, in accordance with the embodiment, the localized digital blocks are in close proximity of the final block with which they must interface, and this interface to all the digital blocks employs a standard SPI or I²C interface. Such segmentation allows for, in accordance with the embodiment, each fundamental digital interface circuit to be placed proximal to and in close proximity of the digitally controlled circuit(s), that is, analog circuits 220-1 through 220-3 which are individual functional blocks of integrated circuit 205, which share an operational connection. Also, in accordance with the embodiment, the configuration allows for such fundamental digital interface circuits and analog circuits to be internally daisy-chained. It will be appreciated that while FIG. 2 illustratively shows distributed architecture 200 with three fundamental digital interface circuits and three analog circuits, any number of such circuits can be configured in accordance with the distributed architecture and bus protocol as described herein for operating with distributed (or segmented) on-chip digital interfaces such as I²C or SPI.

Figure 3:
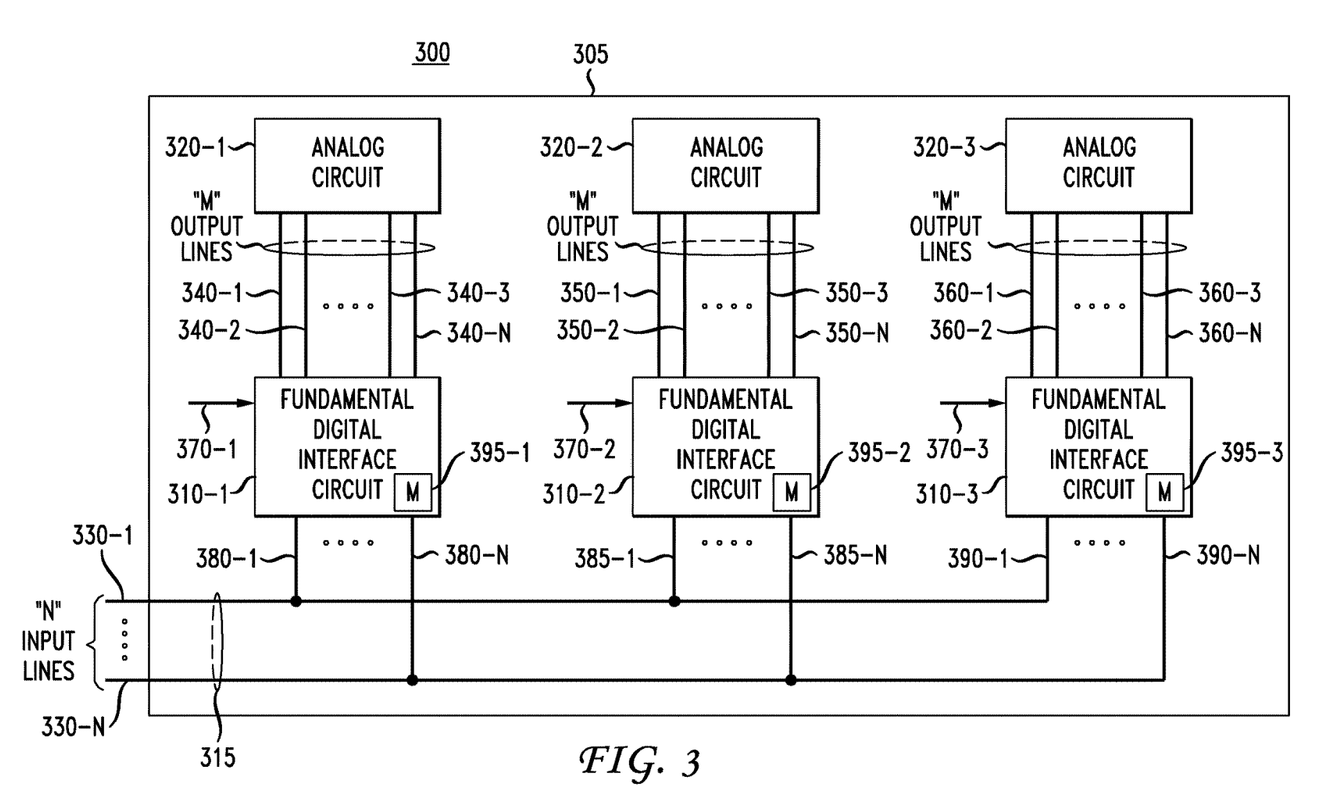
FIG. 3 shows an illustrative distributed architecture for an integrated circuit configuration having a segmented digital interface block in accordance with a further embodiment.

FIG. 3 shows an illustrative distributed architecture for an integrated circuit configuration having a segmented digital interface block in accordance with a further embodiment. In particular, distributed architecture 300 can again be utilized with either of the I²C or SPI protocols (or other protocols or systems operating in substantially the same way). The distributed architecture 300 is illustratively shown for integrated circuit 305 having a plurality of fundamental digital interface circuits, namely, fundamental digital interface circuit 310-1, fundamental digital interface circuit 310-2, and fundamental digital interface circuit 310-3 having multiple inputs, namely, input 330-1 through 330-N. As shown in FIG. 3, input 330-1 through 330-N forming a set of "N" input lines, where N is an integer value, communicated over and forming bus 315. As will be appreciated, such input lines can be command/address lines, assert lines, clock lines, data response lines, and flag lines, to name just a few. Each respective fundamental digital interface circuit has a set of respective outputs. Illustratively, fundamental digital interface circuit 310-1 has a plurality of outputs, namely, output 340-1, 340-2, 340-3 through 340-N, fundamental digital interface circuit 310-2 has a plurality of outputs, namely, output 350-1, 350-2, 350-3 through 350-N, and fundamental digital interface circuit 310-3 has a plurality of outputs, namely, output 360-1, 360-2, 360-3 through 360-N. In accordance with this further embodiment, each such fundamental digital interface circuit is further configured with a local memory, namely, memory 395-1, memory 395-2, and memory 395-3 which may be any type of well-known memory such as a random access memory. This localized memory allows for the storage of certain data useful in adjusting in operating the parameters of their respective fundamental digital interface circuit. For example, this localized memory can hold calibration data for analog circuits which may be unique to each integrated circuit and thus must be updated during normal integrated circuit operation. Localized memory can also hold dynamic configuration data which may be adjusted and may differ depending upon the operational mode of the integrated circuit.

As shown in FIG. 3, each of these plurality of outputs from the respective fundamental digital interface circuit (i.e., fundamental digital interface circuit 310-1, fundamental digital interface circuit 310-2, and fundamental digital interface circuit 310-3) again form a set of "M" lines where M is an integer value. Thus, integrated circuit 305 is configured with a plurality of fundamental digital interface circuits wherein each such fundamental digital interface circuit has a set of inputs (e.g., a set of N inputs such as input 330-1 through input 330-N) and a set of outputs (e.g., a set of M outputs such as output 350-1 through 350-N) where N and M are again integers and M is greater than or equal to N, and a plurality of signal paths (i.e., input 330-1 through input 330-N) are routed from a particular externally accessible location on the integrated circuit to the corresponding input (or inputs) of a particular one (or ones) fundamental digital interface circuit of the plurality of fundamental digital interface circuits. For example, inputs 380-1 through 380-N of fundamental digital interface circuit 310-1, inputs 385-1 through 385-N of fundamental digital interface circuit 310-2, and inputs 390-1 through 390-N of fundamental digital interface circuit 310-3. In accordance with the embodiment, it will be noted, that the selection of the integers M and N, respectively, must be such that the M number of outputs is greater than or equal to the N number of inputs.

Importantly, in accordance with this further embodiment, distributed architecture 300 is, illustratively, divided such that the available address space is divided into the individual segments represented by fundamental digital interface circuit 310-1, fundamental digital interface circuit 310-2, and fundamental digital interface circuit 310-3. Further, each of the fundamental digital interface circuits has an input port associated therewith, namely input port 370-1 associated with fundamental digital interface circuit 310-1, input port 370-2 associated with fundamental digital interface circuit 310-2, and input port 370-3 associated with fundamental digital interface circuit 310-3 whereby a unique value is applied to define a unique memory address space associated with the respective fundamental digital interface circuit. Such segmentation allows for, in accordance with the embodiment, each fundamental digital interface circuit to be placed proximal to and in close proximity of the digitally controlled circuit(s), that is, analog circuits 320-1, 320-2, and 320-3 which are individual functional blocks of integrated circuit 305, which share an operational connection. Also, in accordance with the embodiment, the configuration allows for such fundamental digital interface circuits and analog circuits to be internally daisy-chained. It will be appreciated that while FIG. 3 illustratively shows distributed architecture 300 with three fundamental digital interface circuits and three analog circuits, any number of such circuits can be configured in accordance with the distributed architecture and bus protocol as described herein for operating with distributed (or segmented) on-chip digital interfaces such as I²C or SPI.

Figure 4:
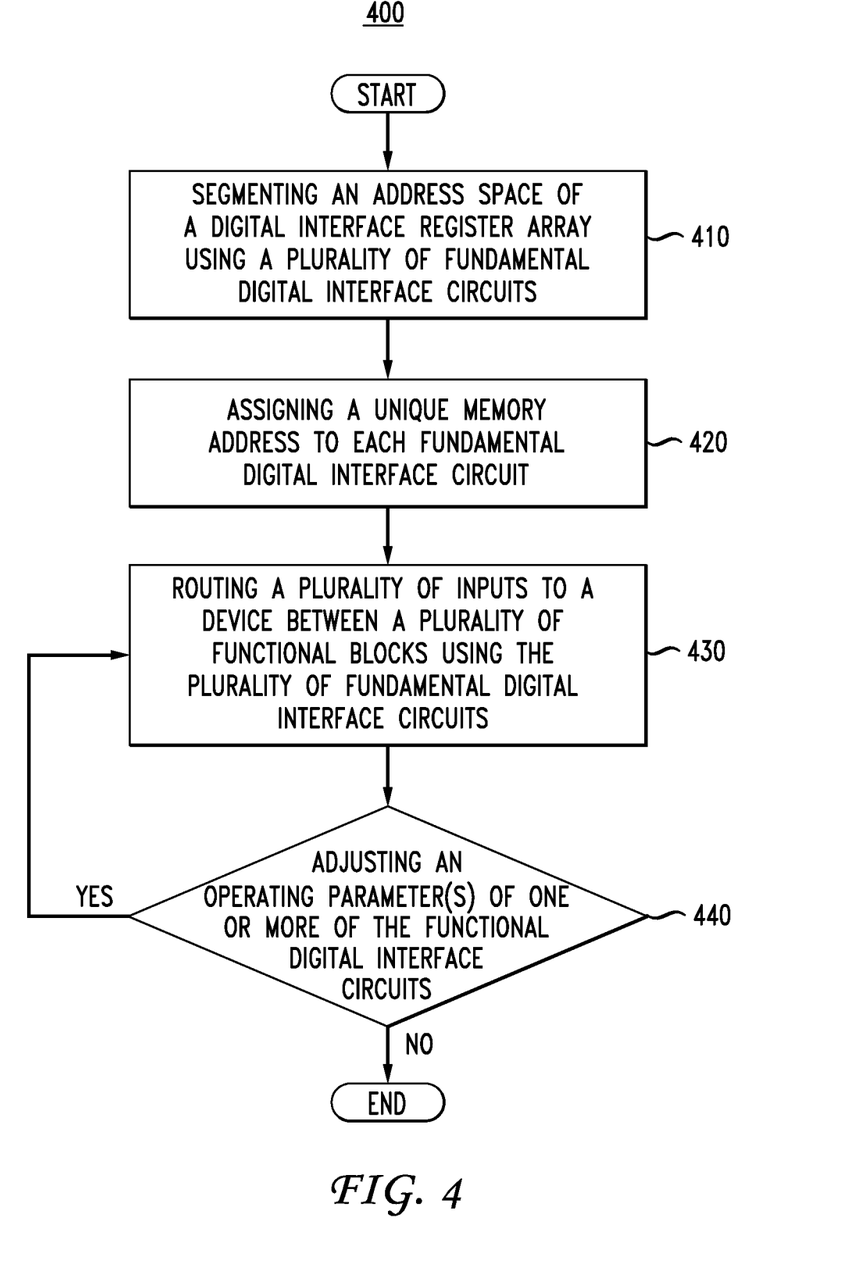
FIG. 4 shows a flowchart of illustrative operations for providing distributed on-chip communications employing a digital interface circuit in accordance with an embodiment.

FIG. 4 shows a flowchart of illustrative operations 400 for providing distributed on-chip communications employing a digital interface circuit in accordance with an embodiment. In accordance with this embodiment, the segmenting of an address space of a digital interface register array is undertaken using a plurality of fundamental digital interface circuits (step 410), as detailed herein above. Each fundamental digital interface circuit is assigned a unique memory address, in step 420, utilizing the respective input port associated with that fundamental digital interface circuit. In accordance with the embodiment, the routing of a plurality of inputs to a device (e.g., an IC) between a plurality of functional blocks of such device, at step 430, is done using the plurality of fundamental digital interface circuits. Further, if any adjusting (step 440) of one or more of the fundamental digital interface circuits is necessary this is done utilizing, illustratively, local stored data as detailed herein above. Advantageously, the segmentation allows for, in accordance with the embodiment, each fundamental digital interface circuit to be placed proximal to and in close proximity of the digitally controlled circuit(s), for example, analog circuits which are individual functional blocks of an integrated circuit, which share an operational connection and common communications bus, for example the analog circuits shown in either FIG. 2 or FIG. 3.

Figure 5:
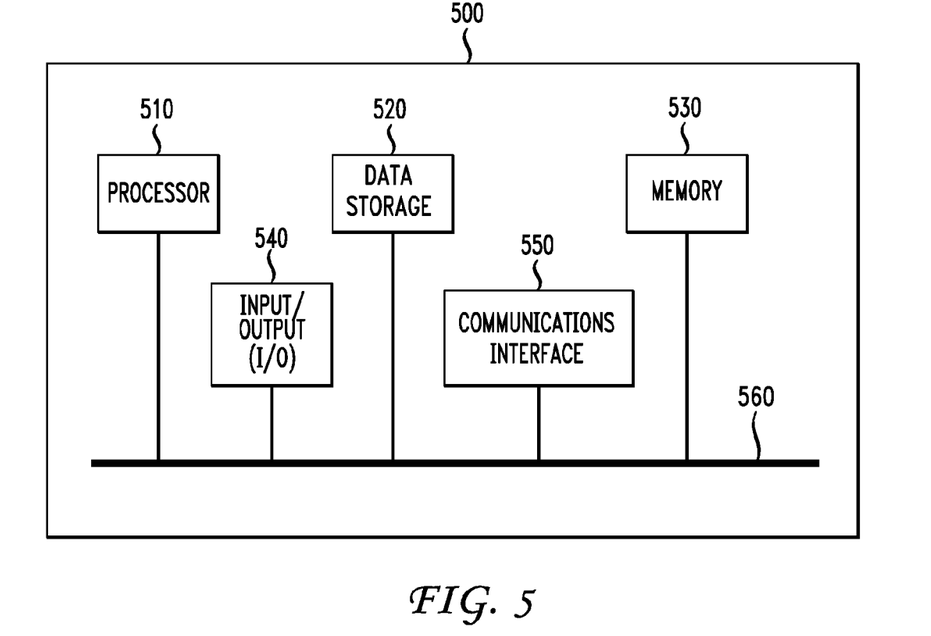
FIG. 5 is a high-level block diagram of an exemplary computer in accordance with an embodiment.

As detailed above, the various embodiments herein can be embodied in the form of methods and apparatuses for practicing those methods. The disclosed methods may be performed by a combination of hardware, software, firmware, middleware, and computer-readable medium (collectively "computer") installed in and/or communicatively connected to a user device or network node, for example. FIG. 5 is a high-level block diagram of an exemplary computer 500 that may be used for implementing a method for providing distributed on-chip communications employing a digital interface circuit in accordance with the various embodiments herein. Computer 500 comprises a processor 510 operatively coupled to a data storage device 520 and a memory 530. Processor 510 controls the overall operation of computer 500 by executing computer program instructions that define such operations. Communications bus 560 facilitates the coupling and communication between the various components of computer 500. The computer program instructions may be stored in data storage device 520, or a non-transitory computer readable medium, and loaded into memory 530 when execution of the computer program instructions is desired. Thus, the steps of the disclosed method (see, e.g., FIG. 4 and the associated discussion herein above) can be defined by the computer program instructions stored in memory 530 and/or data storage device 520 and controlled by processor 510 executing the computer program instructions. For example, the computer program instructions can be implemented as computer executable code programmed by one skilled in the art to perform the illustrative operations defined by the disclosed method. Accordingly, by executing the computer program instructions, processor 510 executes an algorithm defined by the disclosed method. Computer 500 also includes one or more communication interfaces 550 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. Computer 500 also includes one or more input/output devices 540 that enable user interaction with computer 500 (e.g., camera, display, keyboard, mouse, speakers, microphone, buttons, etc.).

Processor 510 may include both general and special purpose microprocessors, and may be the sole processor or one of multiple processors of computer 500. Processor 510 may comprise one or more central processing units (CPUs), for example. Processor 510, data storage device 520, and/or memory 530 may include, be supplemented by, or incorporated in, one or more application-specific integrated circuits (ASICs) and/or one or more field programmable gate arrays (FPGAs).

Data storage device 520 and memory 530 each comprise a tangible non-transitory computer readable storage medium. Data storage device 520, and memory 530, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 540 may include peripherals, such as a camera, printer, scanner, display screen, etc. For example, input/output devices 540 may include a display device such as a cathode ray tube (CRT), plasma or liquid crystal display (LCD) monitor for displaying information to the user, a keyboard, and a pointing device such as a mouse or a trackball by which the user can provide input to computer 500.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A communications device, comprising:
   a plurality of functional blocks, each one of the plurality of functional blocks configured as an analog circuit; and
   a plurality of digital interface circuits for routing a plurality of inputs of the communications device between the plurality of digital interface circuits and the plurality of functional blocks, and each one of the digital interface circuits being associated with a corresponding one of the plurality functional blocks, and each digital interface circuit having a unique memory address, and forming a particular one segment of a plurality of non-overlapping segments for dividing a digital address space of the communications device among the plurality of digital interface circuits, and
   wherein each digital interface circuit having a plurality of inputs and a plurality of outputs, the plurality of outputs being greater than or equal to the plurality of inputs and the plurality of outputs connecting to inputs of the corresponding one of the functional blocks.

2. The communications device of claim 1 wherein each one of the digital interface circuits includes an input port, the input port capable of being operated to set the unique memory address of the one of the digital interface circuits.

3. The communications device of claim 2 further comprising:

a memory integrated with at least one digital interface circuit for storing data that is operable in adjusting at least one operation of the at least one digital interface circuit.

4. The communications device of claim 1 wherein each functional block is located proximally to and inter-operably connected with the corresponding one of the digital interface circuits.

5. The communications device of claim 1 further comprising:
a communications bus connected to the plurality of inputs of the digital interface circuits.

6. The communications device of claim 5 wherein the communications bus operates in accordance with one of an Inter-Integrated Circuit (I²C) protocol and a Serial Peripheral Interface (SPI) protocol.

7. The communications device of claim 1 wherein the digital address space is associated with a digital interface register array.

8. The communications device of claim 1 wherein the communications device is an integrated circuit and the plurality of functional blocks are connected in a daisy chain configuration.

9. The communications device of claim 1, wherein the plurality of digital interface circuits are fundamental digital interface circuits.

10. The communications device of claim 9 wherein each functional block is located proximally to and inter-operably connected with the corresponding one of the fundamental digital interface circuits.

11. The communications device of claim 9, further comprising:
a communications bus connected to the plurality of inputs of the fundamental digital interface circuits.

12. The communications device of claim 11, wherein the communications bus operates in accordance with one of an Inter-Integrated Circuit (I²C) protocol and a Serial Peripheral Interface (SPI) protocol.

13. The communications device of claim 9, further comprising:
a memory integrated with at least one fundamental digital interface circuit for storing data that is operable in adjusting at least one operation of the at least one fundamental digital interface circuit.

14. A method for communicating data to a plurality of functional blocks in a device having a digital interface register array, the method comprising:
routing a plurality of inputs to the device to a plurality of functional blocks by utilizing a plurality of digital interface circuits, each one of the plurality of functional blocks configured as an analog circuit, and each functional block being connected to a corresponding one digital interface circuit; and
wherein a digital address space of the digital interface register array is segmented between the digital interface circuits, each digital interface circuit having a unique address of the digital address space, and forming a particular one segment of a plurality of non-overlapping segments of the digital interface register array, and each digital interface circuit having a plurality of inputs and a plurality of outputs wherein the plurality of outputs being greater than or equal to the plurality of inputs and the plurality of outputs connecting to inputs of the corresponding one of the functional blocks.

15. The method of claim 14 further comprising:
assigning the unique memory address using an input port associated with the digital interface circuit.

16. The method of claim 14 wherein particular ones of the functional blocks are located proximally to and inter-operably connected with a respective different one digital interface circuit of the plurality of digital interface circuits.

17. The method of claim 14 further comprising:
adjusting at least one operation of at least one digital interface circuit using data from a memory integrated with the at least one digital interface circuit.

18. The method of claim 14 wherein the routing is performed in accordance with one of an Inter-Integrated Circuit (I²C) protocol and a Serial Peripheral Interface (SPI) protocol.

19. The method of claim 14 wherein the plurality of functional blocks are connected in a daisy chain configuration.

20. The method of claim 14, wherein the plurality of digital interface circuits are fundamental digital interface circuits.

21. The method of claim 20, wherein particular ones of the functional blocks are located proximally to and inter-operably connected with a respective different one fundamental digital interface circuit of the plurality of fundamental digital interface circuits.

22. The method of claim 20, further comprising:
adjusting at least one operation of at least one fundamental digital interface circuit using data from a memory integrated with the at least one fundamental digital interface circuit.

23. The method of claim 20, wherein the routing is performed in accordance with one of an Inter-Integrated Circuit (I²C) protocol and a Serial Peripheral Interface (SPI) protocol.

24. A system comprising:
a plurality of functional blocks, each one of the plurality of functional blocks configured as an analog circuit and located proximally to and inter-operably connected with a corresponding one of a plurality of digital interface circuits; and
a communications bus configured with the plurality of digital interface circuits, each digital interface circuit having a unique memory address, and forming a particular one segment of a plurality of non-overlapping segments for dividing a digital address space of a digital interface register array among the plurality of interface circuits, and each digital interface circuit having a plurality of inputs and a plurality of outputs wherein the plurality of outputs being greater than or equal to the plurality of inputs, and the plurality of outputs connecting to inputs of the corresponding one of the functional blocks.

25. The system of claim 24 wherein the communications bus operates in accordance with one of an Inter-Integrated Circuit (I²C) protocol and a Serial Peripheral Interface (SPI) protocol.

26. The system of claim 24 wherein the plurality of inputs are associated with an integrated circuit.

27. The system of claim 26 wherein particular ones of the plurality of functional blocks are an analog circuit.

28. The system of claim 24, wherein the plurality of digital interface circuits are fundamental digital interface circuits.

29. The system of claim 28, wherein the communications bus operates in accordance with one of an Inter-Integrated Circuit (I²C) protocol and a Serial Peripheral Interface (SPI) protocol.

* * * * *